(12) United States Patent
Zanfei et al.

(10) Patent No.: US 9,120,533 B2
(45) Date of Patent: Sep. 1, 2015

(54) WHEEL FOR PEDAL-ASSISTED BIKES

(75) Inventors: Adriano Zanfei, Rovereto (IT); Fabio Giorgi, Rovereto (IT)

(73) Assignee: C.R.D. CENTRO RICERCHE DUCATI TRENTO S.R.L., Rovereto (IT)

( * ) Notice: Subject to any disclaimer, the term of this patent is extended or adjusted under 35 U.S.C. 154(b) by 50 days.

(21) Appl. No.: 14/004,914

(22) PCT Filed: Mar. 12, 2012

(86) PCT No.: PCT/IB2012/000458
§ 371 (c)(1),
(2), (4) Date: Sep. 25, 2013

(87) PCT Pub. No.: WO2012/123802
PCT Pub. Date: Sep. 20, 2012

(65) Prior Publication Data
US 2014/0054953 A1    Feb. 27, 2014

(30) Foreign Application Priority Data
Mar. 16, 2011 (IT) ...................... MO 2011 A 000062

(51) Int. Cl.
B60K 1/00 (2006.01)
B62M 6/65 (2010.01)
B62M 6/50 (2010.01)
B62M 11/16 (2006.01)

(52) U.S. Cl.
CPC . *B62M 6/65* (2013.01); *B62M 6/50* (2013.01); *B62M 11/16* (2013.01)

(58) Field of Classification Search
USPC ............... 280/200, 208; 180/205, 206, 206.1, 180/219, 227, 228
See application file for complete search history.

(56) References Cited

U.S. PATENT DOCUMENTS 6,196,347 B1 * 3/2001 Chao et al. ................. 180/206.2

FOREIGN PATENT DOCUMENTS

| CN | 1 799 922 | 7/2006 |
|---|---|---|
| EP | 0 557 932 | 9/1993 |

(Continued)

OTHER PUBLICATIONS

International Search Report dated Jun. 28, 2012; corresponding to PCT/IB2012/000458.

*Primary Examiner* — John Walters
*Assistant Examiner* — James Triggs
(74) *Attorney, Agent, or Firm* — Young & Thompson

(57) ABSTRACT

Wheel for pedal-assisted bikes includes:
a fixed structure associable with the frame of a bike having a driving pedal crank;
  a circle element mounted on the structure for rotation around a main rotation axis;
  a propulsion disc rotatably mounted on the structure and connectable to the crank;
  an electric motor associated with the structure and for cooperating with the propulsion disc to motorize the circle element; and
transmission elements for transmitting rotary motion from the disc to the circle element which include a first detection device for detecting the force transmitted to the circle element from the disc, and including:
a first plate associated in rotation with one of the disc and the circle element;
a second plate associated with the other of the disc and the circle element;
at least a motion transmission part between the first plate and second plate.

17 Claims, 8 Drawing Sheets

(56) References Cited

FOREIGN PATENT DOCUMENTS

| EP | 0 832 816 | 4/1998 |
|---|---|---|
| EP | 1 466 824 | 10/2004 |
| JP | 10 230893 | 9/1998 |
| JP | 2003-160089 | 6/2003 |
| WO | 2010/091323 | 8/2010 |

* cited by examiner

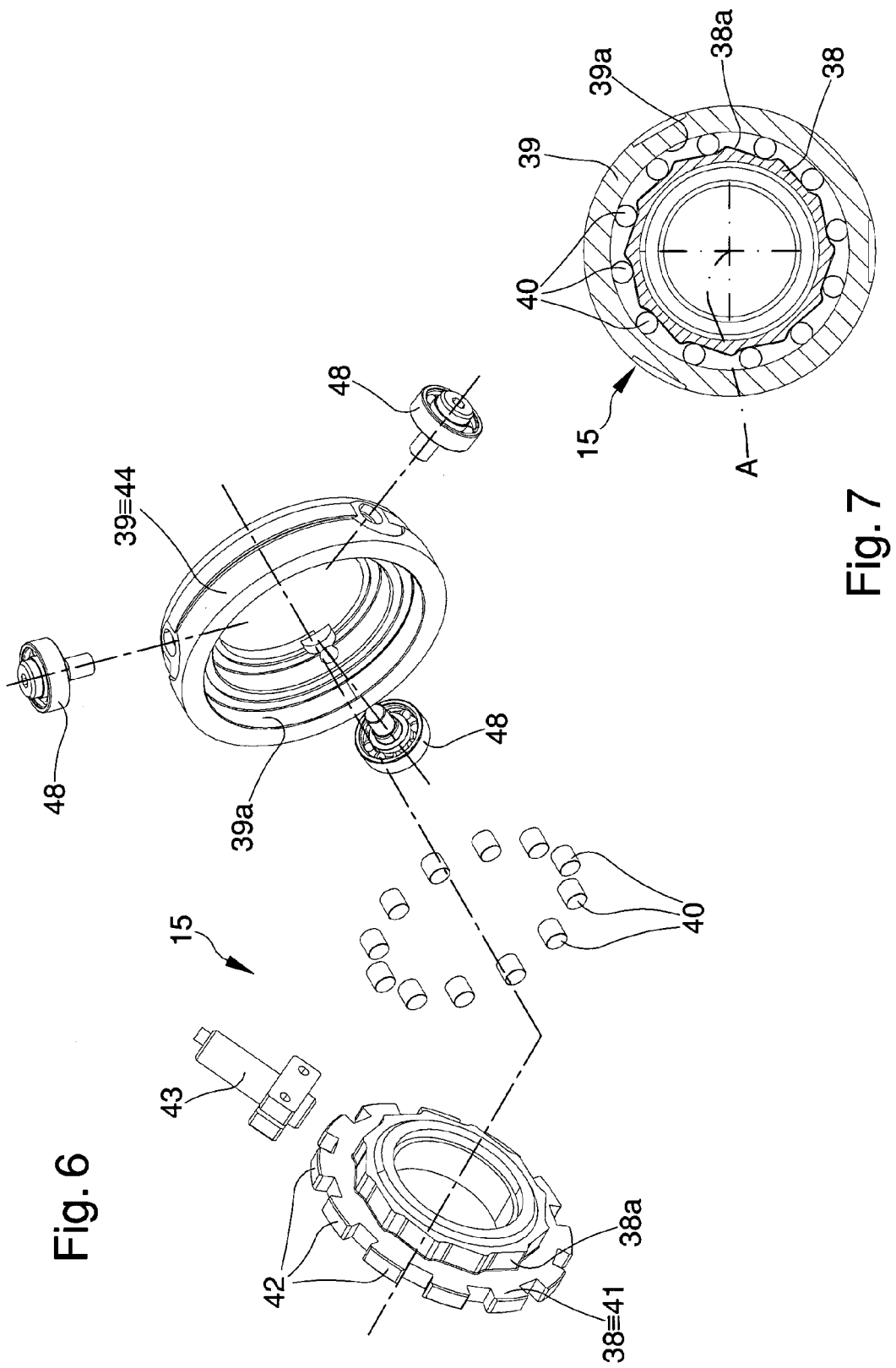

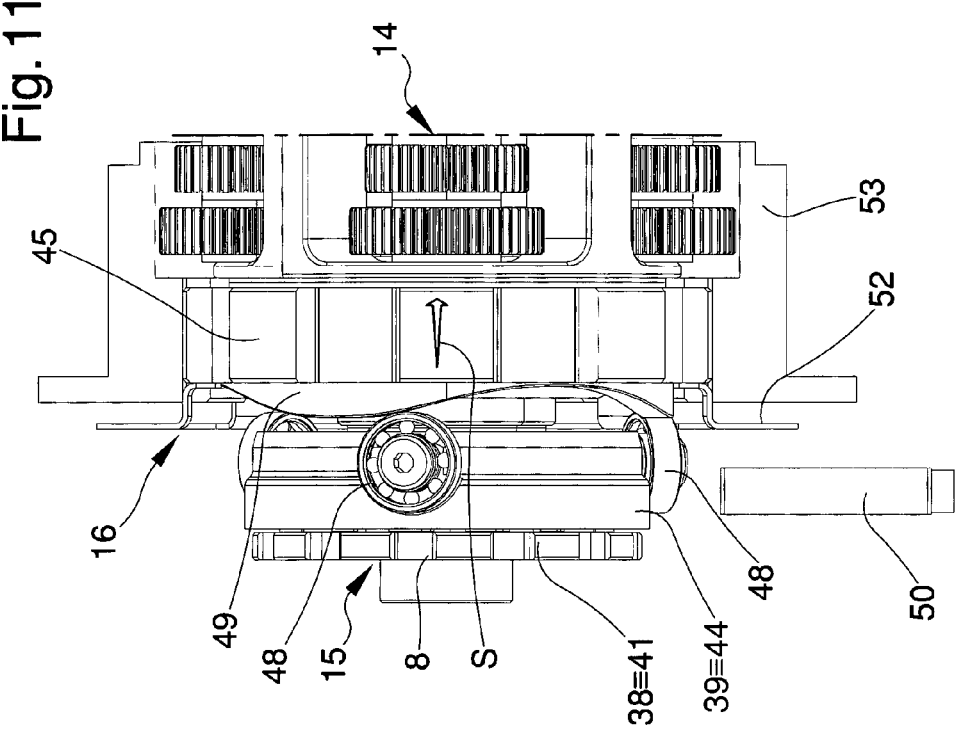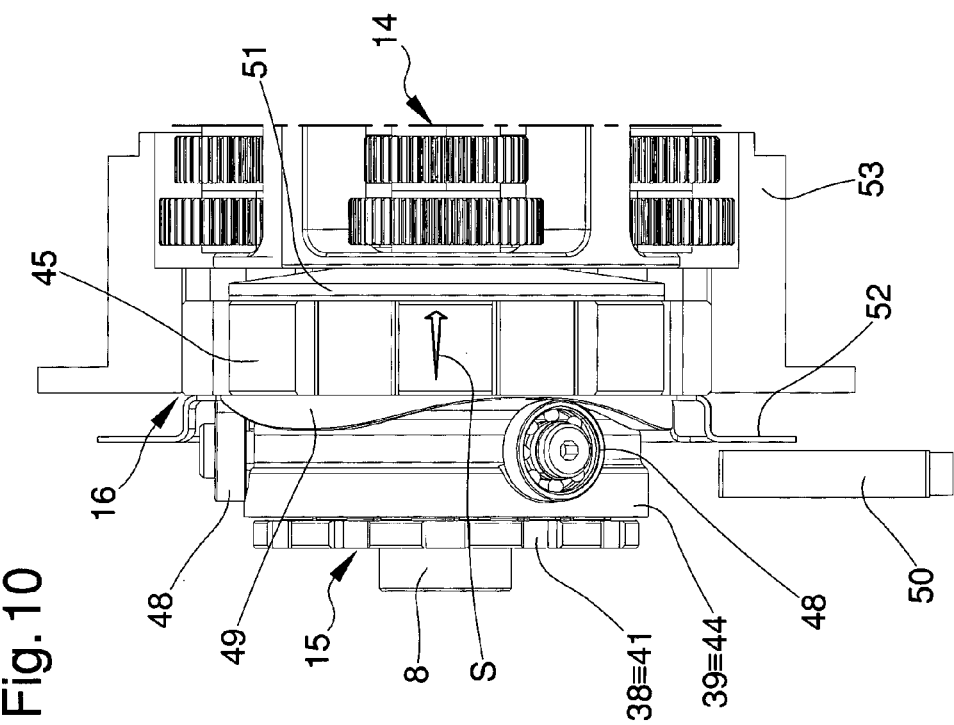

WHEEL FOR PEDAL-ASSISTED BIKES

TECHNICAL FIELD

The present invention relates to a wheel for pedal-assisted bikes.

BACKGROUND ART

Pedal-assisted bikes are bicycles with an auxiliary electric motor having the following specifications:
  maximum continuous power rating of the electric motor: 0.25 kW;
  motor supply gradually reduced and interrupted when 25 km/h is achieved;
  motor supply interrupted before 25 km/h if the cyclist stops pedalling.

The electric motor is controlled by means of a processing and control unit which controls the power supply according to the pedal force of the user, balancing the engagement of the transmission gradually from when pedalling starts, to make this smooth and regular.

For this purpose, pedal-assisted bikes have a force sensor in correspondence to the pedals or a speed sensor positioned in the pedal crank or both.

In traditional pedal-assisted bikes, the electric motor is housed directly in the hub of the motorised wheel and is powered by a battery pack which, instead, is fitted on the bicycle frame.

Considering the need to equip the bike with all the aforementioned components designed to perform various different functions, the traditional pedal-assisted systems are usually conceived, right from the design stage, to be fitted on a specific bike model.

Only rarely in fact is it possible to develop a kit able to adapt to several bike models, taking into account the considerable differences between the bicycles on the market, in particular their frames which, of course, have shapes and dimensions so different as to prevent a practical and complete standardisation of pedal-assisted systems.

It must also be underlined that the fitting of a kit for pedal-assisted bikes during the after-sales stage, even if this were possible, usually calls for the performance of inconvenient and not very practical operations concerning the adjustment and the fitting of the various components to the frame which more often than not cannot be performed by the end user and requires the intervention of an expert technician.

To partially overcome the aforementioned drawbacks, the integration is known in the motorised wheel of not only the electrical drive motor but also of the battery pack, as described for example in the patent document WO 2010/091323.

This constructive solution however is not without drawbacks either.

In this respect, it should first of all be noticed that the integration of the battery pack in the motorised wheel only in part simplifies pedal-assisted system fitting and removal operations because it in any case remains necessary to install force and/or speed sensors on the bike pedal crank, as well as all other components.

To this must be added that, quite apart from where the battery pack is positioned either on the wheel or on the frame, the motorised wheels for pedal-assisted bikes can not always be combined in a practical and easy way with the traditional mechanical gears usually used to reduce or multiply the motion transmission ratio from the pedal crank.

The fact that the hub of the motorised wheel is almost completely occupied by the electric motor in fact determines the fact that this wheel cannot be combined with gear change devices inside the hub, such as, e.g., the Rohloff gear change but can only be combined with external devices, such as traditional derailleur gears, which nevertheless are not standardised and vary according to the bike model.

DESCRIPTION OF THE INVENTION

The main object of the present invention is to provide a wheel for pedal-assisted bike that can be fitted on any traditional already-existing bike model, providing this, in a practical, easy and functional way, with the functions of pedal-assisted bikes.

Another object of the present invention is to provide a wheel for pedal-assisted bikes that allows overcoming the mentioned drawbacks of the background art within the ambit of a simple, rational, easy and effective to use as well as low cost solution.

The above mentioned objects are achieved by the present wheel for pedal-assisted bikes, comprising:
  at least a fixed structure associable with the frame of a bike having a driving pedal crank;
  at least a circle element mounted on said fixed structure in a rotatable way around a main rotation axis;
  at least a propulsion disc mounted on said fixed structure in a rotatable way and connectable to said driving pedal crank;
  motion transmission means for the transmission of the rotary motion from said propulsion disc to said circle element; and
  at least an electric motor associated with said fixed structure and suitable for cooperating with said propulsion disc to motorize said circle element;
characterised in that said motion transmission means comprise at least a first detection device suitable for detecting the force transmitted to said circle element from said propulsion disc, said first detection device comprising:
  at least a first plate associated in rotation with one between said propulsion disc and said circle element;
  at least a second plate associated with the other between said propulsion disc and said circle element through a prismatic coupling suitable for making it rotatable around said main rotation axis and sliding along a sliding direction substantially parallel to said main rotation axis;
  at least a motion transmission part between said first plate and said second plate, which is associated with at least one between said first plate and said second plate and is suitable for engaging a grip ramp which is associated with the other between said first plate and said second plate and is inclined with respect to a plane transversal to said main rotation axis, the engagement of said grip ramp by said motion transmission part determining the sliding of said second plate along said sliding direction until it is arranged in a position corresponding to the force transmitted; and
  at least a detection sensor for detecting the position of said second plate along said sliding direction.

BRIEF DESCRIPTION OF THE DRAWINGS

Other characteristics and advantages of the present invention will become more evident from the description of a preferred, but not sole, embodiment of a wheel for pedal-assisted bikes, illustrated purely as an example but not limited to the annexed drawings in which:

FIG. 6 is an exploded view of the freewheel mechanism of the wheel according to the invention;

FIG. 7 is a crosswise section view of the freewheel mechanism of the wheel according to the invention;

FIGS. 10 and 11 show, in a sequence of side views, the operation of the first detection device of the wheel according to the invention.

EMBODIMENTS OF THE INVENTION

With particular reference to such Figures, globally indicated by 1 is a wheel for pedal-assisted bikes.

The wheel 1 is set to be fitted on any type of bike B having a frame T and a driving pedal crank P.

Figure 1:
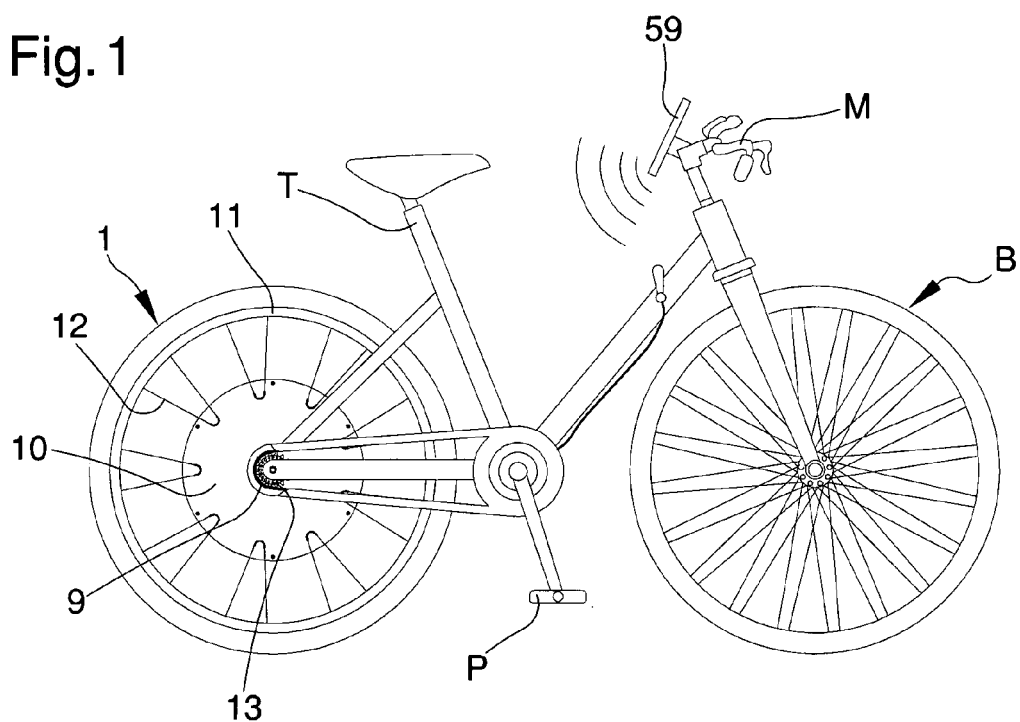
FIG. 1 is a side view of a bike with the wheel according to the invention.
Figure 2:
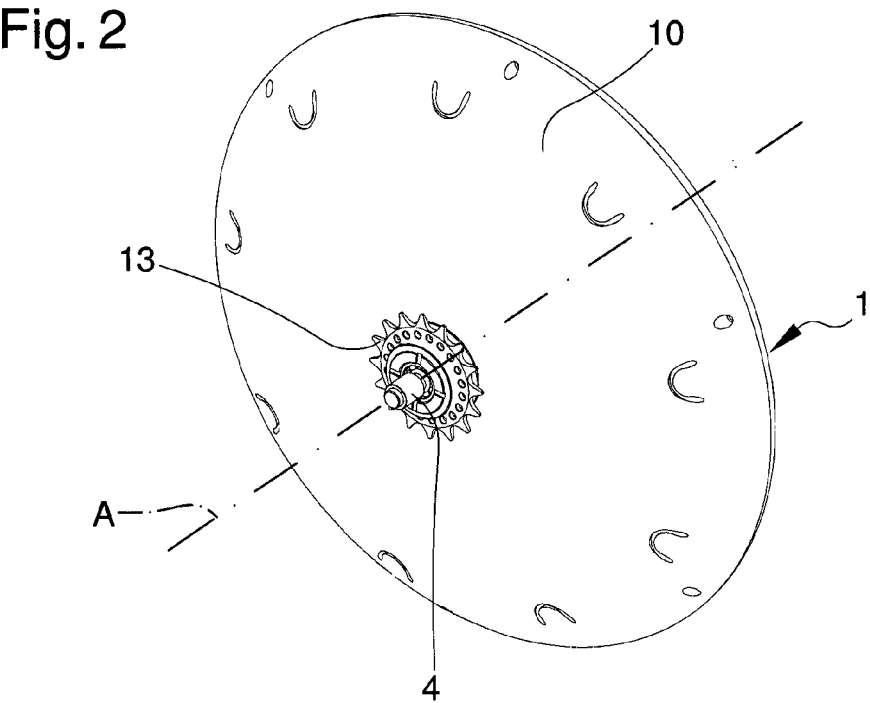
FIG. 2 is an axonometric view of a portion of the wheel according to the invention.
Figure 3:
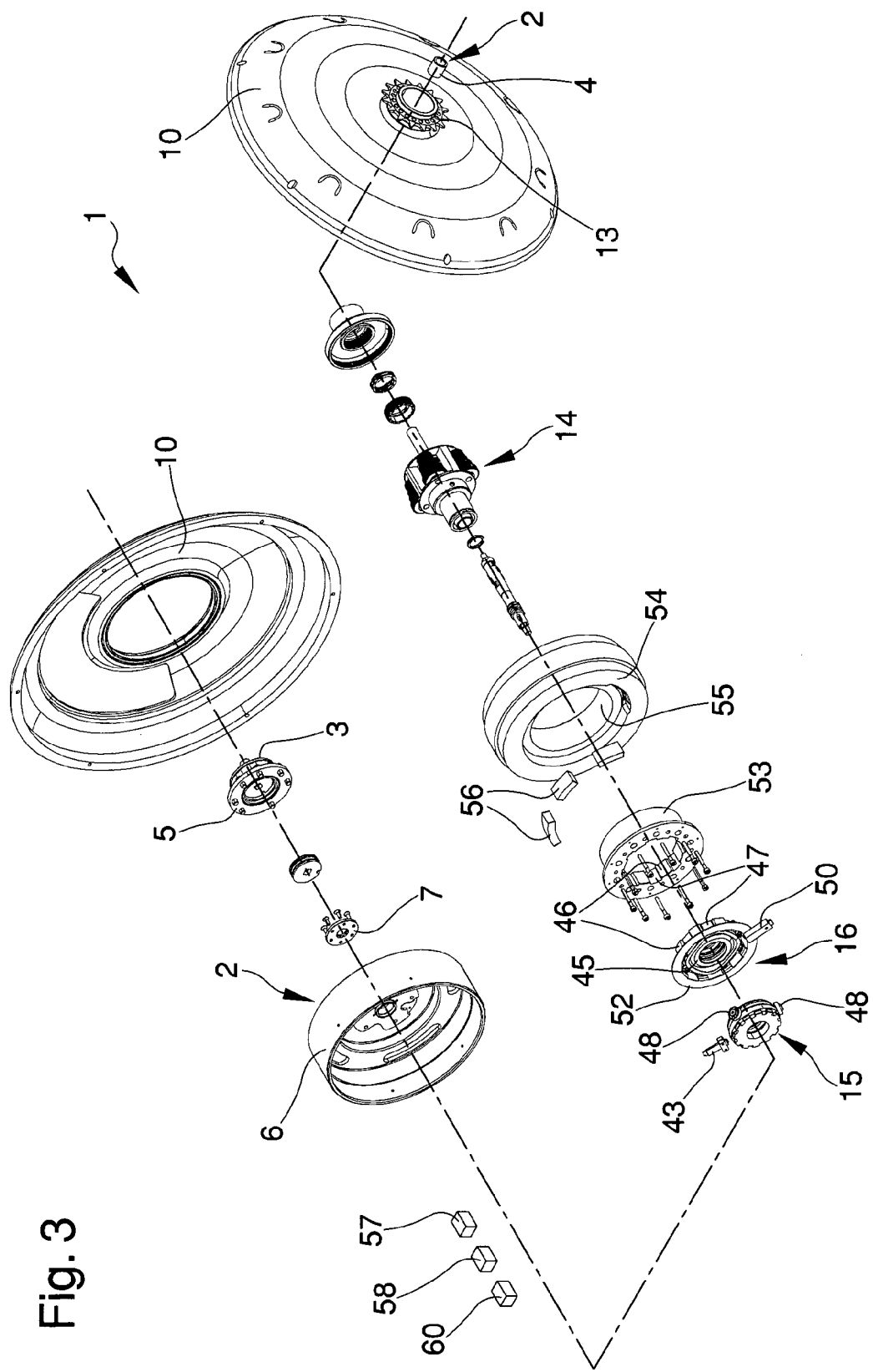
FIG. 3 is an exploded view of the portion of wheel in FIG. 2.
Figure 4:
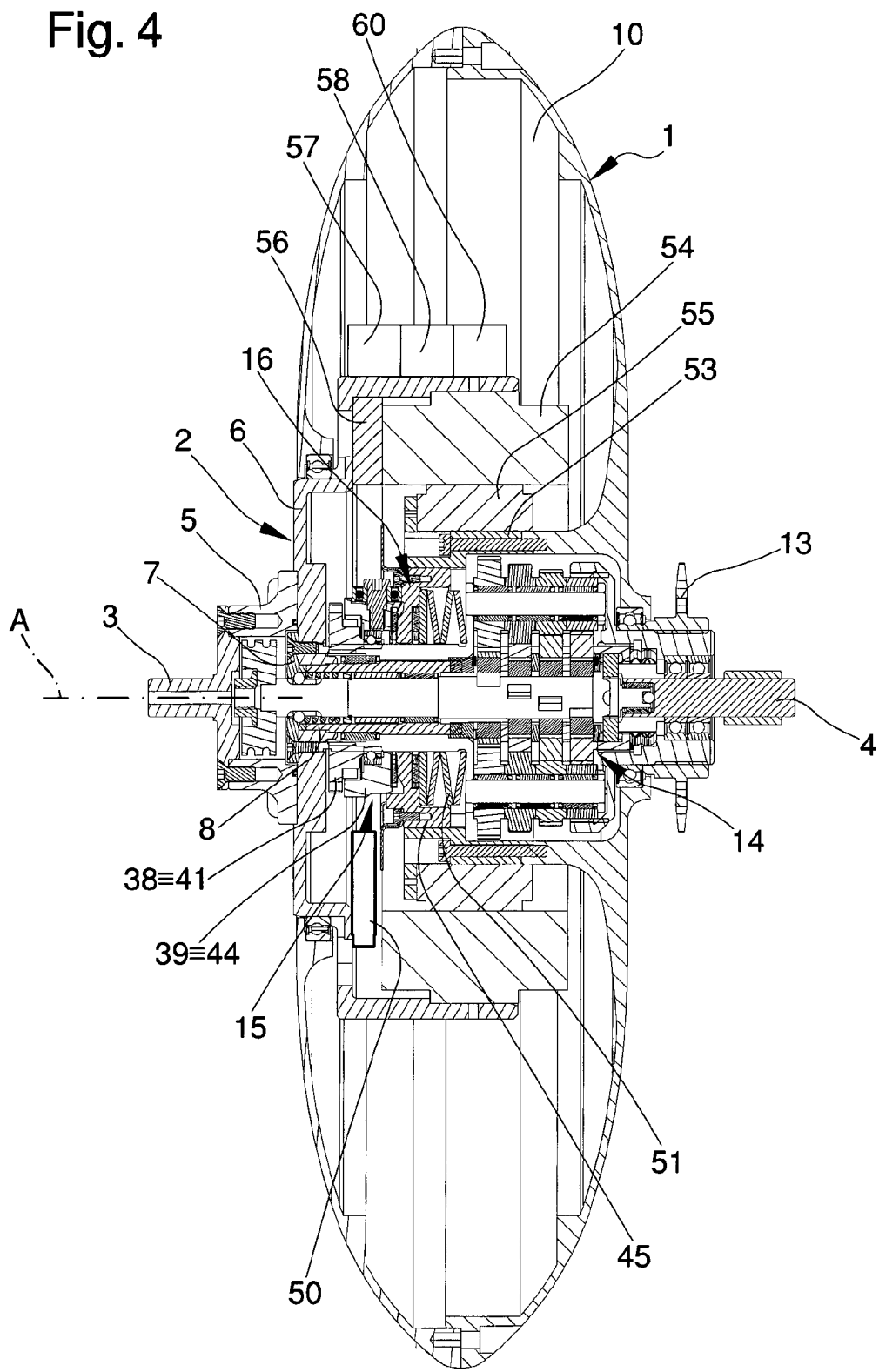
FIG. 4 is an axial section view of the portion of wheel in FIG. 2.
Figure 5:
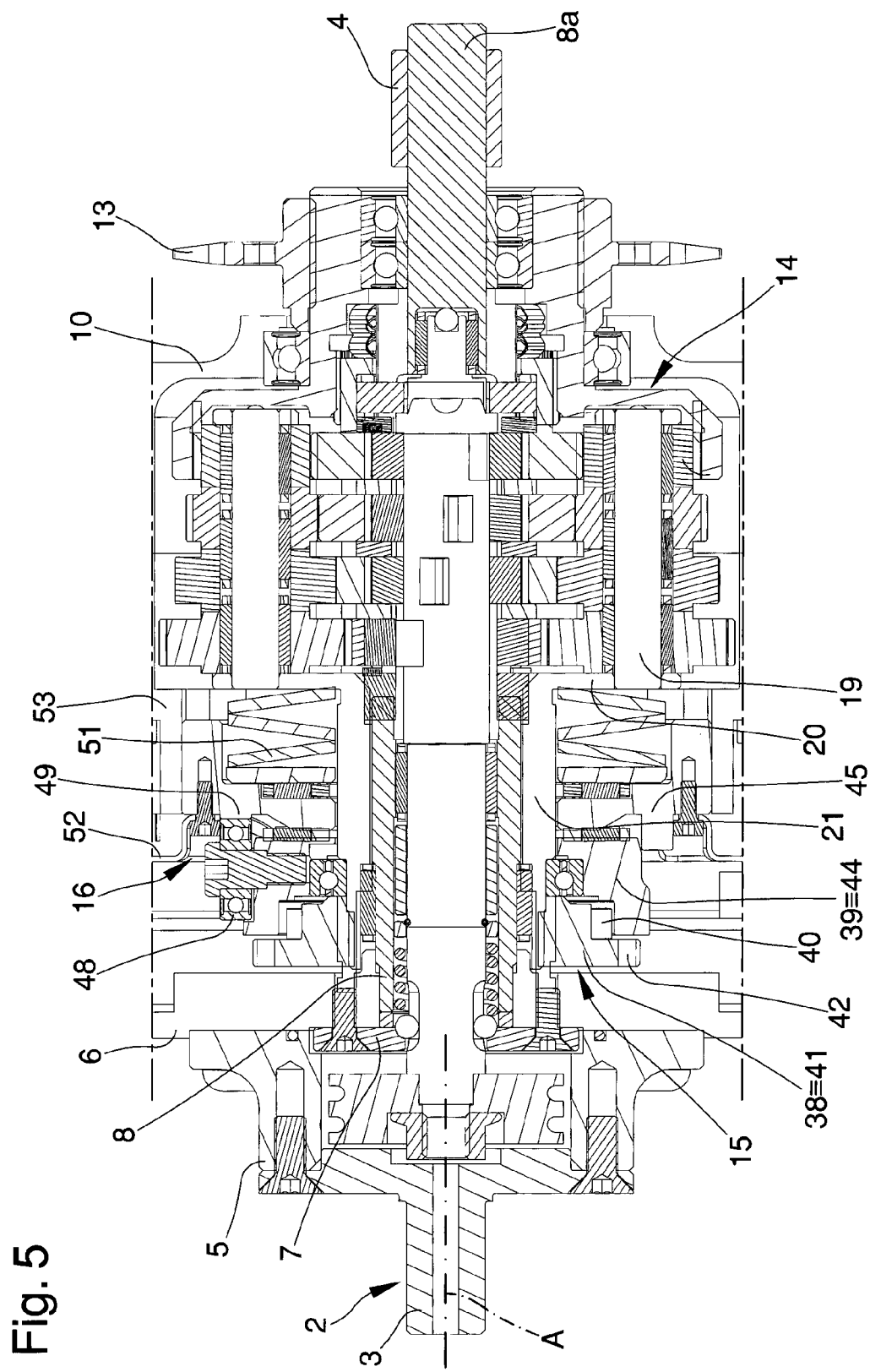
FIG. 5 is a section view, on enlarged scale, of a detail of FIG. 4.
Figure 8:
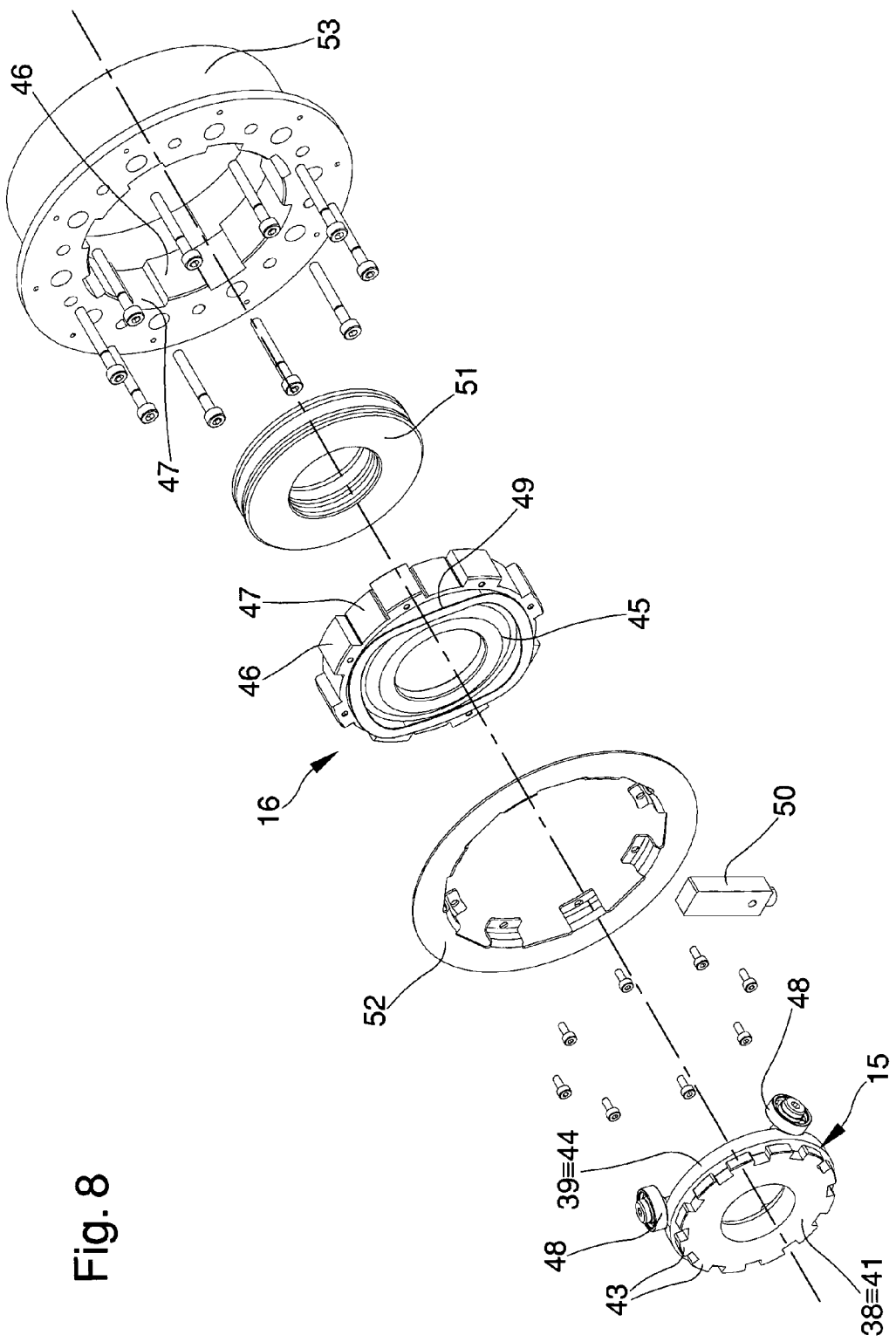
FIG. 8 is an exploded view of the first detection device of the wheel according to the invention.
Figure 9:
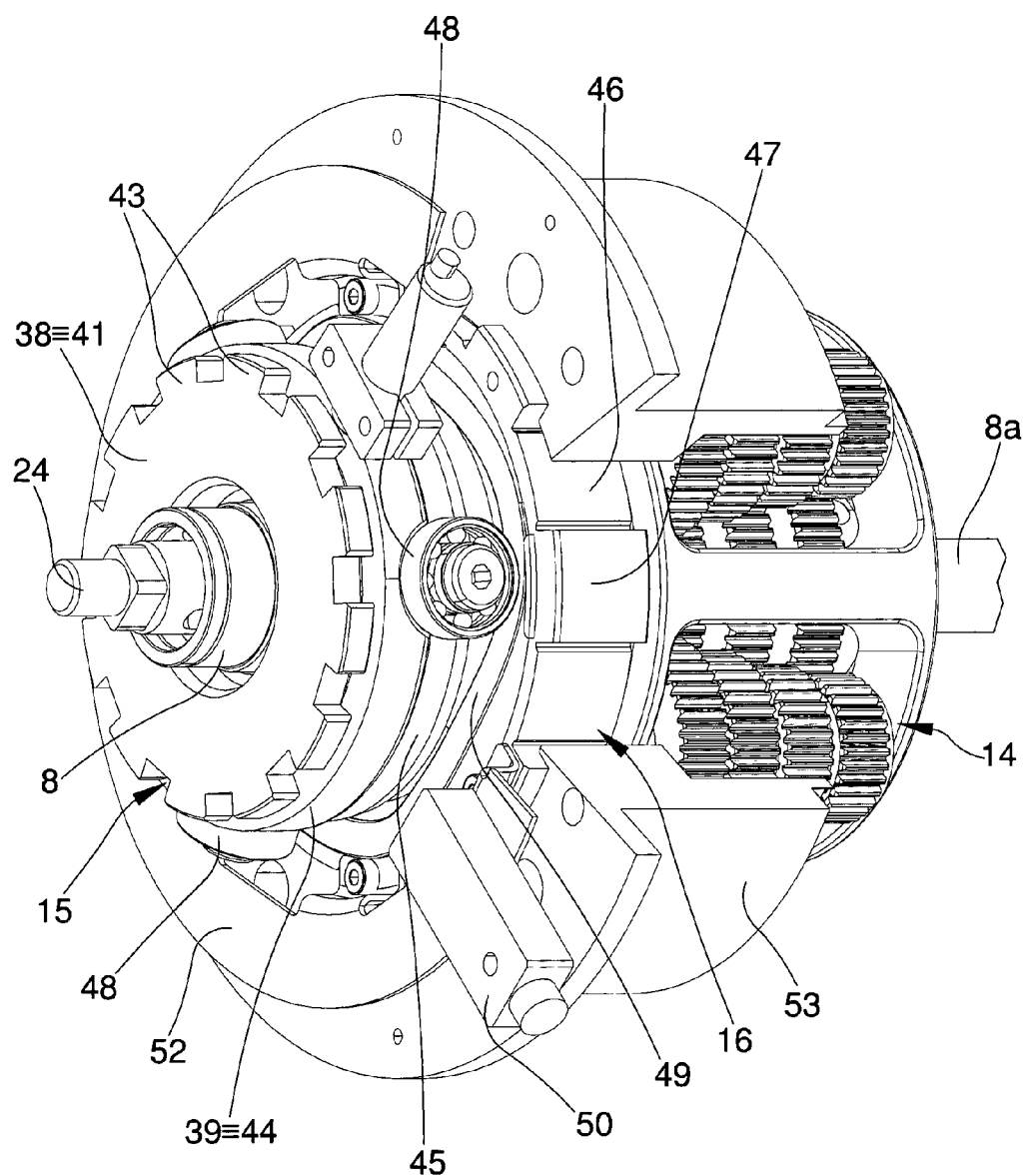
FIG. 9 is an axonometric, partially broken, view of the motion transmission means of the wheel according to the invention.

In the particular embodiment shown in FIG. 1, for example, the wheel 1 is fitted as rear wheel of the bike B.

For this purpose, the wheel 1 comprises a fixed structure 2 which is associable with the rear part of the frame T and which, in particular, has a first axle 3 and a second axle 4 arranged on opposite sides of the wheel 1 and fixable to the frame T in a way in itself traditional.

The first axle 3 is rigidly associated with a cup element 5, in turn rigidly associated with a disc element 6, at the centre of which a plaque 7 is screwed on and a sleeve 8 is interlocked.

The sleeve 8 ends up with a pin extremity 8a which supports or defines the second axle 4.

In the particular embodiment shown in the illustrations, the fixed structure 2 is therefore made up of the axles 3, 4, of the cup element 5, of the disc element 6, of the plaque 7 and of the sleeve 8.

On the fixed structure 2 is fitted in a rotatable way a circle element 10, 11, 12.

The circle element 10, 11, 12 can turn with respect to the fixed structure 2 around a main rotation axis A coaxial with the axles 3, 4.

The circle element 10, 11, 12 comprises:
- a central boxed casing 10, with a substantially discoid shape;
- an external circular framework 11, supporting a tyre for the circulation of the bike B on the road; and
- a series of tie-rods 12 for connecting the central boxed casing 10 to the external circular framework 11.

In correspondence to the second axle 4 of the fixed structure 2 is fitted in a rotatable way a propulsion disc 13, e.g., of the traditional gear pinion type, which can be connected to the driving pedal crank P by means of a flexible part 9 such as a chain or the like.

With the propulsion disc 13 are associated motion transmission means 14, 15, 16 suitable for transferring the rotation motion from the propulsion disc 13 to the circle element 10, 11, 12.

The motion transmission means 14, 15, 16 comprise:
- a speed gear device 14 suitable for changing the motion transmission ratio from the propulsion disc 13 to the circle element 10, 11, 12;
- a freewheel mechanism 15; and
- a first detection device 16 suitable for detecting the force (or, in other words the torque) coming from the propulsion disc 13 and transmitted to the circle element 10, 11, 12.

More in detail, it is underlined that the succession of connections along which the motion is transmitted from the propulsion disc 13 to the circle element 10, 11, 12 is the following: the propulsion disc 13 is associated with the speed gear device 14 which is associated with the freewheel mechanism 15 which is associated with the first detection device 16 which is associated with the circle element 10, 11, 12.

It must also be noted that the first detection device 16 is usefully integrated in the motion transmission means 14, 15, 16 and represents a fundamental part of this to transmit motion to the circle element 10, 11, 12, as will be better described below.

The speed gear device 14 is substantially coaxial to the main rotation axis A, is of the planetary type and allows to reduce or multiply the transmission ratio between the propulsion disc 13 and a planet carrier body 19, 20, 21.

The planet carrier body 19, 20, 21 has a series of axes 19 which are associated with a transversal plate 20 terminating in a coupling 21, which is fitted around the sleeve 8, is rotatable coaxially with the main rotation axis A and represents the exit motor body of the speed gear device 14.

Around the coupling 21 are arranged both the freewheel mechanism 15 and the first detection device 16.

The freewheel mechanism 15 comprises a first rotating part 38, keyed to the coupling 21, and a second rotating part 39, fitted on the coupling 21 in a rotatable way and which can be dragged in rotation by the first rotating part 38 as long as the user applies to the driving pedal crank P a rotation equal to or greater than that of the circle element 10, 11, 12.

For this purpose the first rotating part 38 and the second rotating part 39 comprise two respective side surfaces 38a, 39a, penetrated the one in the other and separated from one another to house a series of small cylinders 40.

One of the side surfaces 38a, 39a is stepped so that if the first rotating part 38 rotates in one direction then solidarization occurs of the second rotating part 39 by the small cylinders 40, while if it turns in the opposite direction, then the small cylinders 40 are free to slide on the second rotating part 39 without dragging it in rotation.

In correspondence to the freewheel mechanism 15 a second detection device 41, 42, 43 is provided suitable for detecting the rotation speed at exit from the speed gear device 14.

The second detection device 41, 42, 43, in particular, comprises a phonic wheel 41, coinciding with the first rotating part 38, which for this purpose has a series of protuberances 42 the transit of which during rotation is detected by means of a pickup sensor 43, of the optical, magnetic type or the like, fitted on the disc element 6 of the fixed structure 2.

The first detection device 16 comprises:
- a first plate 44, coinciding with the second rotating part 39 of the freewheel mechanism 15, which is rotatable around the main rotation axis A and can be operated in rotation by the motion of the propulsion disc 13, which by means of the speed gear device 14 and of the freewheel mechanism 15 reaches the first plate 44;

a second plate 45 associated with the circle element 10, 11, 12 by means of a prismatic coupling 46, 47, suitable for making it rotatable around the main rotation axis A together with the circle element 10, 11, 12 and, at the same time, sliding with respect to the circle element 10, 11, 12 along a sliding direction S (FIGS. 10 and 11) substantially parallel to the main rotation axis A;

at least one motion transmission part 48 for transmitting motion between the first plate 44 and the second plate 45, which is associated with the first plate 44 and is suitable for engaging a grip ramp 49 associated with the second plate 45 and inclined with respect to a plane transversal to the main rotation axis A. In practice, the engagement of the grip ramp 49 by the motion transmission part 48 determines the sliding of the second plate 45 along a sliding direction S until it takes up a position which depends on the force transmitted to the second plate 45;

a detection sensor 50 suitable for detecting the position of the second plate 45; and elastic means 51 of contrast to the moving away of the second plate 45 from the first plate 44, preferably composed of a bellows spring having one extremity up against the second plate 45 and the opposite extremity up against the transversal plate 20.

Advantageously, the first plate 44 bears a plurality of motion transmission parts 48 which engage an equal number of grip ramps 49 obtained on the second plate 45.

The motion transmission parts 48, e.g., are composed of a series of bearings, of the ball type or the like, rotatable around respective axes at right-angles to the main rotation axis A.

The rotation motion is transmitted from the first plate 44 to the second plate 45 when the bearings 48 and the relative grip ramps 49 reach a specific relative position which permits transferring to the circle element 10, 11, 12 the force required by the load conditions during pedalling.

In fact, in low-load conditions (e.g., pedalling on the flat), the bearings 48 are able to transfer motion and drag in rotation the grip ramps 49 and the second plate 45 without any particular difficulty (FIG. 10).

In heavier load conditions (e.g., pedalling uphill), instead, the first plate 44 is unable to immediately grip on the second plate 45.

The first plate 44, therefore, spins freely with respect to the second plate 45 for a certain angle of rotation, which determines the engagement of the grip ramps 49 by the bearings 48 and the sliding of the second plate 45 along the sliding direction S in contrast to the elastic means 51.

Such sliding stops as soon as the bearings 48 are able to transmit enough force to the grip ramps 49 to drag these in rotation, and, along with them, also the second plate 45 and the circle element 10, 11, 12 (FIG. 11).

In the same way, it is underlined that during pedalling the user applies a thrust on the driving pedal crank P which has a discontinuous pattern, characterised by the alternation of continuous maximums and minimums.

In correspondence to the thrust maximums, the first plate 44 receives a force in excess to that needed to drag the second plate, and this determines the elevation of the bearings 48 on the grip ramps 49.

In correspondence to the thrust minimums, instead, the force which reaches the first plate 44 is less and the bearings 48 engage the grip ramps 49 in a different position.

It therefore appears clear how, depending on the force transmitted between the first plate 44 and the second plate 45, the bearings 48 assume a corresponding relative position on the grip ramps 49, determining a corresponding excursion of the second plate 45 along the sliding direction S.

Usefully, the detection sensor 50 is associated with the disc element 6 of the fixed structure 2 and is a contact-less distance sensor, of the magnetic or optical type, suitable for measuring the distance from a dish 52 which is rigidly fitted on the second plate 45 and is substantially at right angles to the sliding direction S.

The distance sensor 50, in practice, is still and facing the dish 52, which moves closer or away according to the movement of the second plate 45 along the sliding direction S.

Advantageously, the prismatic coupling 46, 47 by means of which the second plate 45 can slide along the sliding direction S consists in particular in a series of ribs 46 and of recesses 47 obtained on the outer surface of the second plate 45 and on the inner surface of a supporting hub 53 rigidly associated with the circle element 10, 11, 12.

The wheel 1 usefully has also an electric motor 54, 55, which is associated with the disc element 6 of the fixed structure 2 and is suitable for cooperating with the motion coming from the driving pedal crank P and from the propulsion disc 13 to motorise the circle element 10, 11, 12.

The electric motor 54, 55 comprises a statoric element 54 fitted on the disc element 6 and a rotoric element 55 associated with the supporting hub 53 and with the circle element 10, 11, 12.

The electric motor 54, 55 is e.g. of the Torque type with permanent or reluctance magnets or the like, with the statoric element 54 and the rotoric element 55 which are substantially ring-shaped and are arranged one inside the other substantially around the motion transmission means 14, 15, 16.

Such particular solution permits reducing the overall measurements in a practical and functional way.

The particular type of electric motor 54, 55 selected, furthermore, also permits providing the wheel 1 with a third detection device suitable for detecting the speed of the circle element 10, 11, 12.

The electric motor 54, 55, in fact, is able to provide information on the relative position between the fixed statoric element 54 and the mobile rotoric element 55, together with the circle element 10, 11, 12, permitting the calculation of the actual speed of the wheel 1 during the forward movement of the bike B on the road.

For the power supply of the electric motor 54, 55, the wheel 1 has a power supply unit 56 associated with the disc element 6 of the fixed structure 2.

The power supply unit 56 is made up, e.g., of one or more battery packs operatively connected to the statoric element 54 of the electric motor 54, 55.

On the fixed structure 2 is also fitted a processing and control unit 57 which is operatively connected to the first detection device 16, to the second detection device 41, 42, 43 and to the electric motor 54, 55 and is suitable for commanding the start of the electric motor 54, 55 depending on the force detected by the first detection device 16 and, if necessary, on other programmable operating parameters.

The processing and control unit 57 is associated with a wireless data transmission device 58, of the radio wave, Bluetooth type or the like, suitable for interfacing the processing and control unit 57 with an external electronic device 59, having a display screen and usable by a user.

The external electronic device 59 consists, e.g., of a dedicated on-board computer or of a software installable on the user's cell phone; in both cases, the external electronic device 59 can be fitted in a practical and convenient way on the handlebars M of the bike B and can be used to display the operating data of the processing and control unit (bike speed, pedalling speed, pedalling force, etc.) and to set the operating parameters.

The processing and control unit 57, furthermore, is operatively associated with a detection appliance 60, fitted usefully on the fixed structure 2 and suitable for detecting environmental pollution, i.e., able to measure the CO, $CO_2$, NO content or that of other polluting substances in the air.

If necessary, the data measured by the detection appliance 60 can also be displayed on the external electronic device 59.

Usefully, the central boxed casing 10 of the circle element 10, 11, 12 is suitable for containing the main mechanical and electronic components of the wheel 1, in particular the motion transmission means 14, 15, 16, the electric motor 54, 55, the power supply unit 56 and the processing and control unit 57, but also the wireless data transmission device 58 and the detection appliance 60.

The operation of the present invention is the following.

During normal use of the bike B, the thrust produced by the user on the driving pedal crank P is transferred to the propulsion disc 13.

Depending on the transmission ratio selected by means of the speed gear device 14, the rotation motion is transferred from the propulsion disc 13 to the coupling 21 which drags the first rotating part 38 in rotation.

At this point, by means of the pickup sensor 43, the pedalling speed produced by the user is detected.

By means of the freewheel mechanism 15 the rotation is transferred from the first rotating part 38 to the second rotating part 39 as long as the user applies to the driving pedal crank P a rotation equal to or greater than that of the circle element 10, 11, 12. From the freewheel mechanism 15, the thrust generated on the driving pedal crank P is transmitted to the bearings 48 of the first plate 44 and, from these, to the grip ramps 49 of the second plate 45, to the supporting hub 53 and to the circle element 10, 11, 12.

The transfer of the motion from the first plate 44 to the second plate 45 determines the sliding of the second plate 45 along the sliding direction S depending on the force actually transmitted.

The detection sensor 50 measures the extent of such sliding and provides a corresponding electronic signal which is processed by the processing and control unit 57 to command or not the intervention of the electric motor 54, 55 depending on a mapping of pre-set parameters.

In the event of the electric motor 54, 55 being started, between the statoric element 54 and the rotoric element 55 a force is produced having the same direction of movement as the bike B which aids the pedalling of the user in making the wheel 1 rotate.

The invention claimed is:

1. A wheel for pedal-assisted bikes, the wheel comprising:
   at least a fixed structure associable with the frame of a bike having a driving pedal crank;
   at least a circle element mounted on said fixed structure in a rotatable manner around a main rotation axis;
   at least a propulsion disc mounted on said fixed structure in a rotatable manner and connectable to said driving pedal crank;
   motion transmission means for the transmission of the rotary motion from said propulsion disc to said circle element; and
   at least an electric motor associated with said fixed structure and configured to cooperate with said propulsion disc to motorize said circle element;
   wherein said motion transmission means comprises at least a first detection device configured to detect the force transmitted to said circle element from said propulsion disc, said first detection device comprising:
   at least a first plate associated in rotation with one of the propulsion disc and the circle element,
   at least a second plate associated with the other of the propulsion disc and the circle element through a prismatic coupling of rib and recesses on the outer surface of the second plate and on the inner surface of a support device associated with the circle element, the prismatic coupling of ribs and recesses being configured to make the second plate rotatable around said main rotation axis and to slide along a sliding direction substantially parallel to said main rotation axis,
   at least a motion transmission part between said first plate and said second plate, the motion transmission part being associated with at least one of the first plate and the second plate, the motion transmission part being configured to engage a grip ramp, disposed at the other of the first plate and the second plate,
   the grip ramp being inclined with respect to a plane transversal to said main rotation axis,
   engagement of said grip ramp by said motion transmission part causing the sliding of said second plate along said sliding direction until the second plate is disposed in a position corresponding to the transmitted force, and
   at least a detection sensor configured to detect the position of said second plate along said sliding direction.

2. The wheel according to the claim 1, wherein said first detection device comprises elastic means providing elastic force against the second plate when the second plate moves away from said first plate.

3. The wheel according to the claim 1, wherein said first plate is rotatable around said main rotation axis and is configured to operate in rotation by the motion of said propulsion disc, said second plate being associated with said circle element.

4. The wheel according to claim 1, wherein said detection sensor is associated with said fixed structure.

5. The wheel according to claim 1, wherein said detection sensor is a contactless distance sensor configured to measure the distance from a dish associated with said second plate.

6. The wheel according to claim 1, wherein said wheel comprises at least a processing and control unit associated with said fixed structure,
   the processing and control unit being operatively connected to said first detection device and to said electric motor,
   the processing and control unit being configured to command the start of said electric motor depending on the force detected by said first detection device.

7. The wheel according to claim 1, further comprising at least a power supply unit associated with said fixed structure, the power supply unit being configured to electrically supply power to said electric motor.

8. The wheel according to claim 1, further comprising:
   at least a processing and control unit associated with said fixed structure,
   the processing and control unit being operatively connected to said first detection device and to said electric motor,
   the processing and control unit being configured to command the start of said electric motor depending on the force detected by said first detection device; and
   at least a power supply unit associated with said fixed structure, the power supply unit configured to electrically supply power to said electric motor, wherein said circle element comprises at least a central boxed casing configured to contain at least said motion transmission means, said electric motor, said power supply unit, and said processing and control unit.

9. The wheel according to claim 1, wherein said motion transmission means comprises at least a speed gear device configured to change the motion transmission ratio from said propulsion disc to said circle element.

10. The wheel according to claim 1, wherein said motion transmission means comprises at least a freewheel mechanism.

11. The wheel according to claim 1, wherein:
said motion transmission means comprises
at least a speed gear device configured to change the motion transmission ratio from said propulsion disc to said circle element, and
at least a freewheel mechanism,
wherein said propulsion disc is associated with said speed gear device, the speed gear device being associated with said freewheel mechanism, the freewheel mechanism being associated with said first detection device, the first detection device being associated with said circle element.

12. The wheel according to claim 9, wherein said motion transmission means comprises a second detection device configured to detect the rotation speed at exit from said speed gear device.

13. The wheel according to the claim 12, wherein said second detection device comprises a phonic wheel.

14. The wheel according to claim 1, further comprising a circle element speed detection device configured to detects the speed of said circle element.

15. The wheel according to claim 6, wherein said processing and control unit is associated with a wireless data transmission device to interface an external electronic device usable by a user.

16. The wheel according to claim 6, wherein said processing and control unit is operatively associated with a detection appliance for the detection of the environmental pollution which is associated with said fixed structure.

17. The wheel according to claim 1, wherein said electric motor comprises
a statoric element associated with said fixed structure, and
a rotoric element associated with said circle element,
said statoric element and said rotoric element being substantially ring-shaped and arranged substantially around said motion transmission means.

* * * * *